H. A. W. WOOD
Dec. 2, 1930. CUTTING CUSHION FOR FOLDING CYLINDERS Re. 17,892
Original Filed Sept. 27, 1928
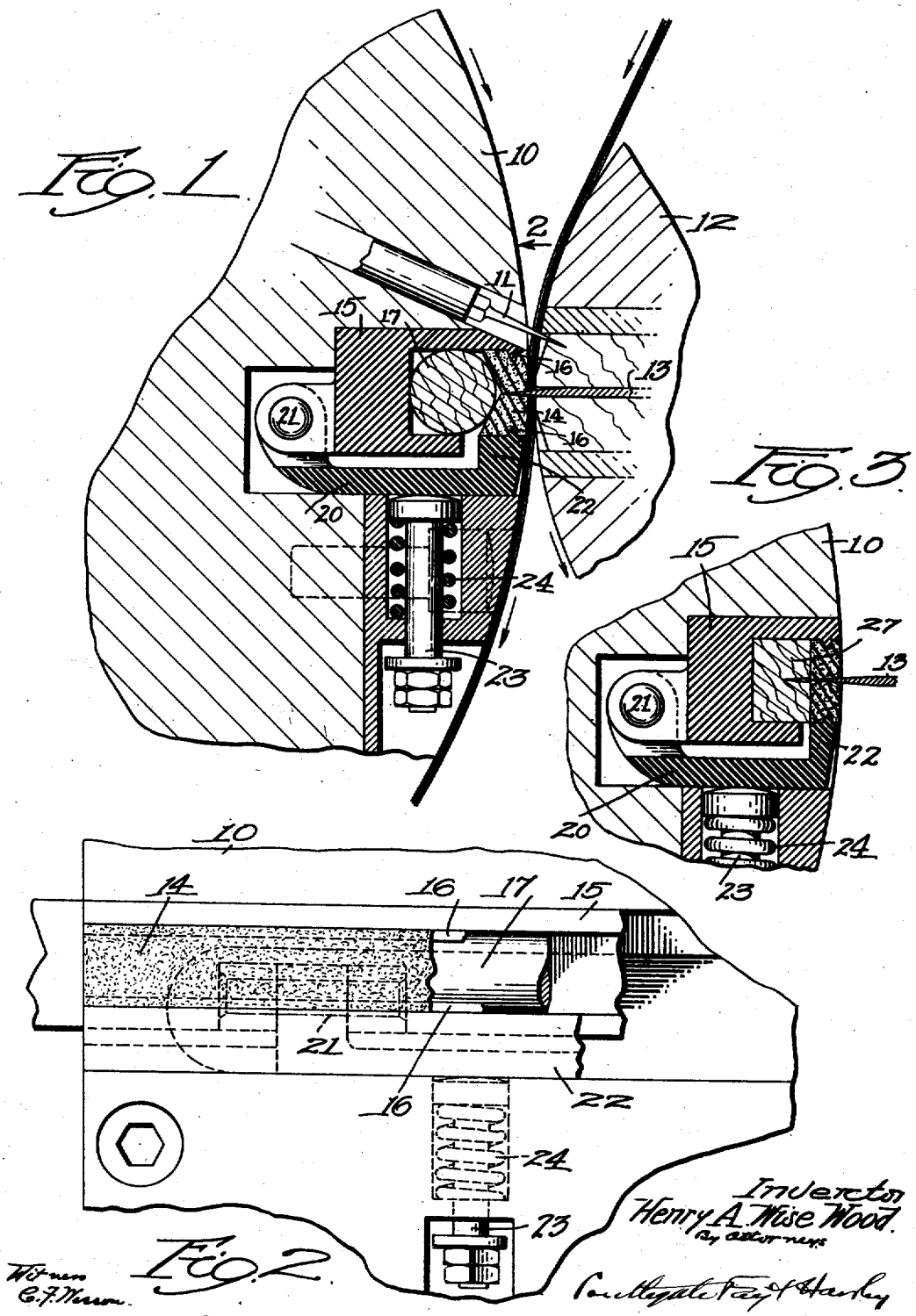
Inventor
Henry A. Wise Wood
By attorneys
Coulter, Hyde & Hartley
Witness
C. F. Mason Reissued Dec. 2, 1930 Re. 17,892

UNITED STATES PATENT OFFICE

HENRY A. WISE WOOD, OF NEW YORK, N. Y., ASSIGNOR TO WOOD NEWSPAPER MACHINERY CORPORATION, OF NEW YORK, N. Y., A CORPORATION OF VIRGINIA

CUTTING CUSHION FOR FOLDING CYLINDERS

Original No. 1,766,807, dated June 24, 1930, Serial No. 308,686, filed September 27, 1928. Application for reissue filed August 27, 1930. Serial No. 478,261.

This invention relates to the cushion usually formed of rubber mounted on the folding cylinder of a folding couple for receiving the cutting blade on the cutting cylinder.

The principal objects of the invention are to provide for backing up the cutting cushion or rubber so as to make cutting easier; to provide a backing device which can be turned easily so as to present a large number of surfaces to the knife as grooves are cut in it thereby; and to provide automatic means for continuously closing up the cut produced in the rubber.

Other objects and advantages of the invention will appear hereinafter.

Reference is to be had to the accompanying drawings, in which

Fig. 1 is a sectional view of a folding couple showing the present invention and its operation;

Fig. 2 is a side view of the folding cylinder, and

Fig. 3 is a view similar to Fig. 1 showing a modification.

Ordinarily the cushion or cutting rubber with which the folding cylinder of a folding couple is provided to receive the thrust of the blade of the cutting cylinder has such dimensions as to permit the knife to pass through a series of webs and into the rubber repeatedly without leaving an unduly large groove therein, but with the best that can be done the groove grows larger and larger and finally becomes too large to offer the proper resistance to the paper while being cut and it has to be removed. While this groove is being worn larger and larger there is a time when an irregular cut is obtained before the rubber is actually replaced. This irregular cut causes considerable trouble in the folder. With this invention these disadvantages are avoided.

Referring to Figs. 1 and 2, the folding cylinder 10 is shown as having the usual impaling pins 11. The usual cutting cylinder 12 is shown, and the usual cutting blade 13. The cutting cushion 14 of soft rubber is located in a holder 15 having projections 16 for holding the rubber. Behind the rubber is located a solid backer 17, shown in this case as a rod or cylinder of wood or other material of a semi-hard nature which will not dull the cutting knife as most kinds of metal would. This fills the space between the holder 15 and backs up the cutting rubber with which it is in contact at two points as indicated.

The introduction of this semi-hard backer imparts considerable stiffness to the rubber 14 in the direction of the cut. This condition is most desirable. It holds the rubber up to its proper position in the cylinder and prevents its displacement inwardly. By having the rod 17 round it can be turned and will present a large number of surfaces to the knife as grooves become cut in the rod Thus it lasts a long time.

Of course the rubber becomes cut anyway and the groove would have a tendency to grow wider, but means are provided for continuously closing in the groove left by the frequent insertion of the knife. This consists of a bar 20 pivoted on a stud 21 and located circumferentially beyond the cutting rubber. It has a projecting surface 22 which takes the place of one side of the holder 15.

By means of a plunger 23 and a spring 24 this bar is constantly forced inwardly and thus the rubber is moved inwardly slightly to compensate for the groove cut in it. In this way the advantages of the semi-hard rubber, which is sometimes employed to secure the desired stiffness, are retained and yet the disadvantage of this hard rubber, which lies in its stiffness and brittleness and results in its early destruction, is avoided. A greater resistance is secured to the cut than has been obtained heretofore with soft rubber, and at the same time the life of the rubber is lengthened since the groove cut therein is continually and continuously being closed up.

In the form shown in Fig. 3, the backing piece of wood 27 is made square and thus the advantages above mentioned are all secured, except that of being able to present different surfaces of the wood to the knife. This backing piece has to be replaced much more frequently than a cylindrical one does.

Although I have illustrated and described only two forms of the invention I am aware of the fact that other modifications can be made therein by any person skilled in the art without departing from the scope of the invention as expressed in the claims. Therefore I do not wish to be limited in this respect but what I do claim is:—

1. The combination with a cutting blade, of a cushion for receiving the blade, a carrier or support for the cushion, and solid means behind the cushion for backing it up, capable of being turned to present different surfaces to the blade.

2. The combination with a cutting blade, of a soft rubber cushion for receiving the edge of the blade, a carrier or support for the cushion, and a semi-hard backer behind the cushion, capable of being turned to present different surfaces to the blade.

3. The combination with a cutting blade, of a cushion to receive the blade, a carrier or support for said cushion, and a cylindrical backing rod located in the carrier behind the cushion for backing it up and imparting stiffness to it.

4. The combination with a cutting blade, of a soft rubber cushion to receive the blade, a carrier or support for said cushion, and a backing rod located in the carrier behind the rubber, capable of being turned to present different surfaces to the blade.

5. The combination with a cutting blade, of a cushion, a carrier or support for the cushion, a solid backing piece behind the cushion for imparting stiffness thereto, and means for pressing one side of the cushion toward the other and thus closing the cut formed in the cushion.

6. The combination with a cutting blade, of a cushion to receive said blade, a carrier or support for the cushion, and yielding means for pressing one side of the cushion laterally toward the other and thus always tending to close the cut formed in the cushion.

7. The combination with a cutting blade, of a cushion for receiving the edge of the blade, a carrier or support for the cushion, the cushion being held in fixed position on one side, a movable member engaging the opposite surface of the cushion, and means for forcing said member toward the cushion to tend to close up the cut formed therein.

8. The combination with a cutting blade, of a rubber for receiving the edge of the blade, a carrier or support for the rubber, the rubber being held in fixed position on one side, a pivoted rod on the opposite side engaging the opposite surface of the cushion, a spring-pressed plunger engaging the back of said rod, and means for forcing the rod toward the rubber to tend to close up the cut formed in it.

In testimony whereof I have hereunto affixed my signature.

HENRY A. WISE WOOD.